US012341243B1

(12) United States Patent
Kness et al.

(10) Patent No.: US 12,341,243 B1
(45) Date of Patent: Jun. 24, 2025

(54) HELIX ANTENNA FEED STRUCTURE WITH COAXIAL IMPEDANCE CONTROL

(71) Applicant: Attotude, Inc., Menlo Park, CA (US)

(72) Inventors: Phillip Kness, San Jose, CA (US); John F Sevic, Prescott, AZ (US); Joy Laskar, Cupertino, CA (US); Romain Pelard, Redwood City, CA (US)

(73) Assignee: Attotude, Inc., Menlo Park, CA (US)

( * ) Notice: Subject to any disclaimer, the term of this patent is extended or adjusted under 35 U.S.C. 154(b) by 180 days.

(21) Appl. No.: 17/473,377

(22) Filed: Sep. 13, 2021

Related U.S. Application Data

(63) Continuation of application No. 17/189,652, filed on Mar. 2, 2021, now abandoned, which is a continuation of application No. 16/893,963, filed on Jun. 5, 2020, now abandoned.

(51) Int. Cl.
*H01Q 1/50* (2006.01)
*H01Q 1/36* (2006.01)
*H01Q 11/08* (2006.01)

(52) U.S. Cl.
CPC ........... *H01Q 11/083* (2013.01); *H01Q 1/362* (2013.01); *H01Q 1/50* (2013.01)

(58) Field of Classification Search
CPC ................................ H01Q 1/362; H01Q 1/50
See application file for complete search history.

(56) References Cited

U.S. PATENT DOCUMENTS 4,427,984 A * 1/1984 Anderson ............ H01Q 21/067 343/895
7,420,522 B1 * 9/2008 Steinbrecher ........ H01Q 17/008 343/893
2010/0045562 A1 * 2/2010 Drake .................... H01Q 11/08 343/895
2015/0250540 A1 * 9/2015 Behdad ............. A61B 18/1815 606/33
2018/0138599 A1 * 5/2018 Shehan .................... H01Q 9/32

* cited by examiner

*Primary Examiner* — Dameon E Levi
*Assistant Examiner* — Anh N Ho
(74) *Attorney, Agent, or Firm* — DUNLAP CODDING, P.C.

(57) ABSTRACT

A microwave helix antenna with a coaxial interface having controlled transmission properties is disclosed. In one aspect, dielectric beads surround a center conductor and are varied in number, thickness and spacing to achieve desired transmission properties.

12 Claims, 9 Drawing Sheets

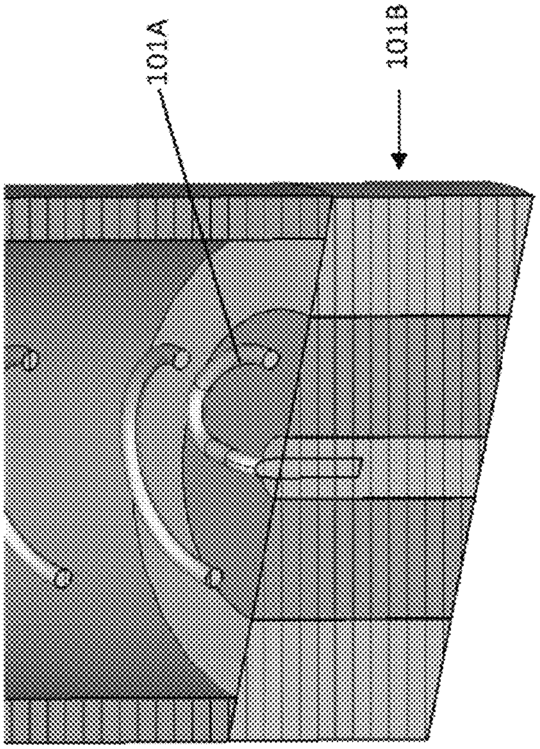
Figure 1B:Cross-section of helix antenna with coaxial feed structure optimized for return loss.

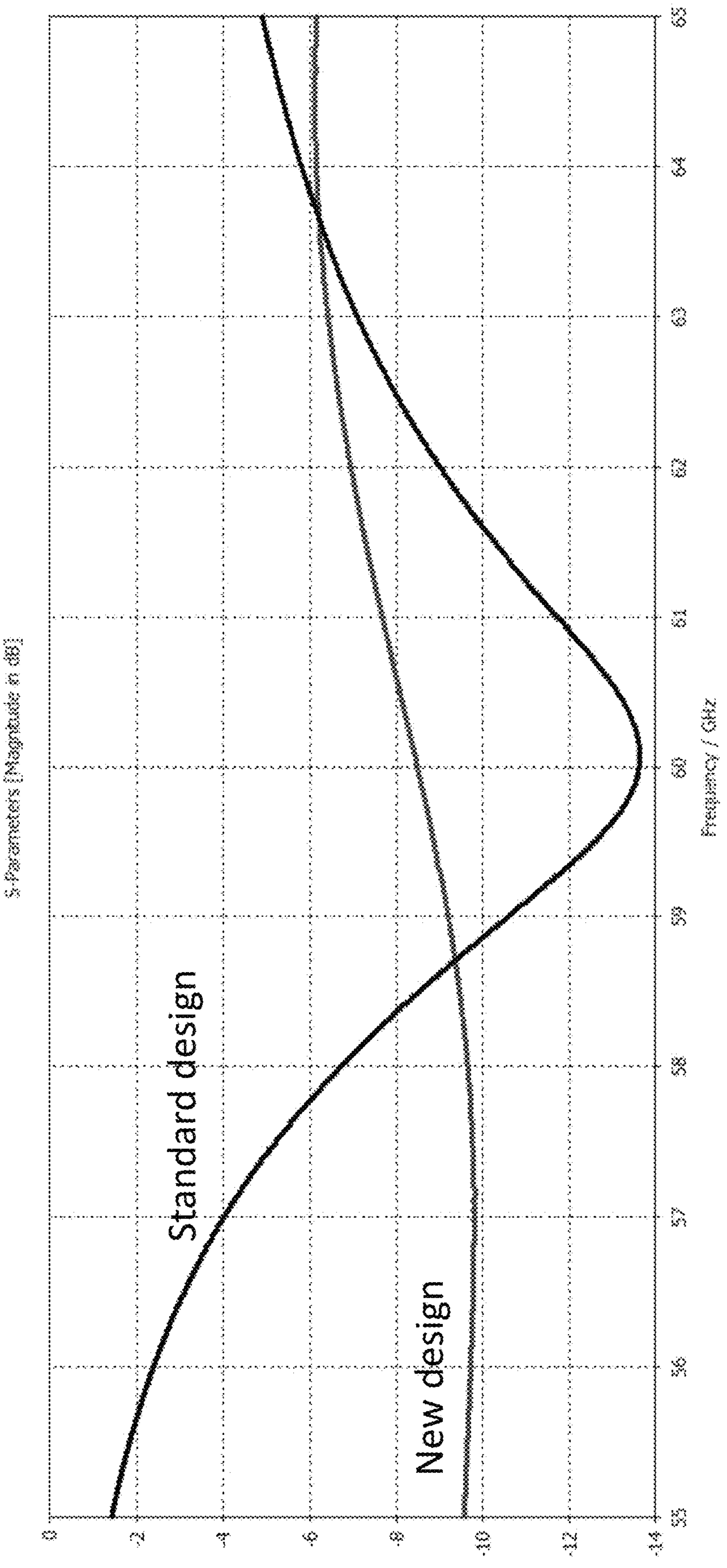
Figure 2B:Return loss of helix antenna with each coaxial feed structure.

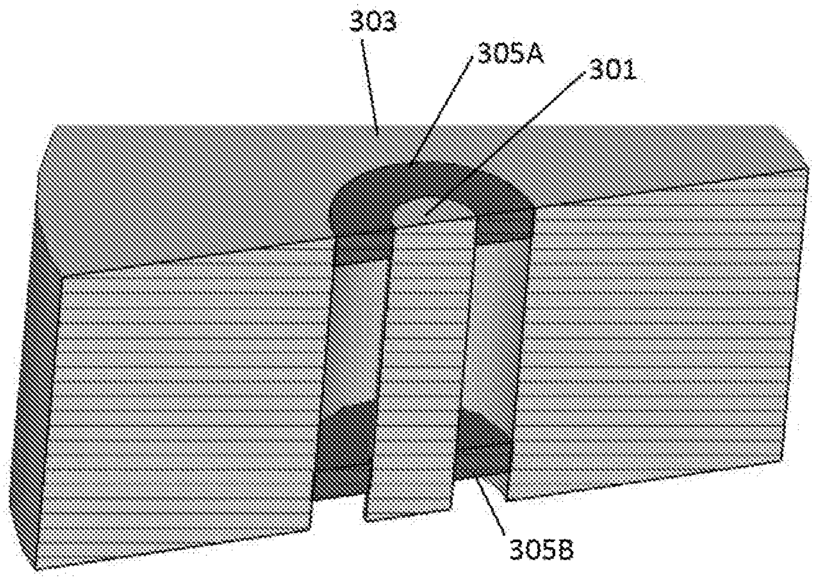
Figure 3A: Cross-sectional view of one embodiment of precise coaxial impedance control using two dielectric pucks.

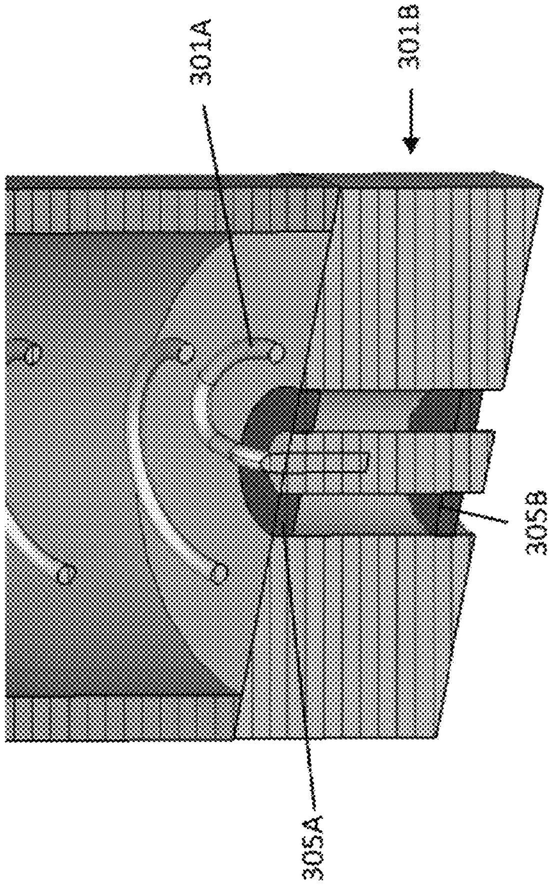
Figure 3B:Cross-section of helix antenna with coaxial feed structure optimized for overall performance.

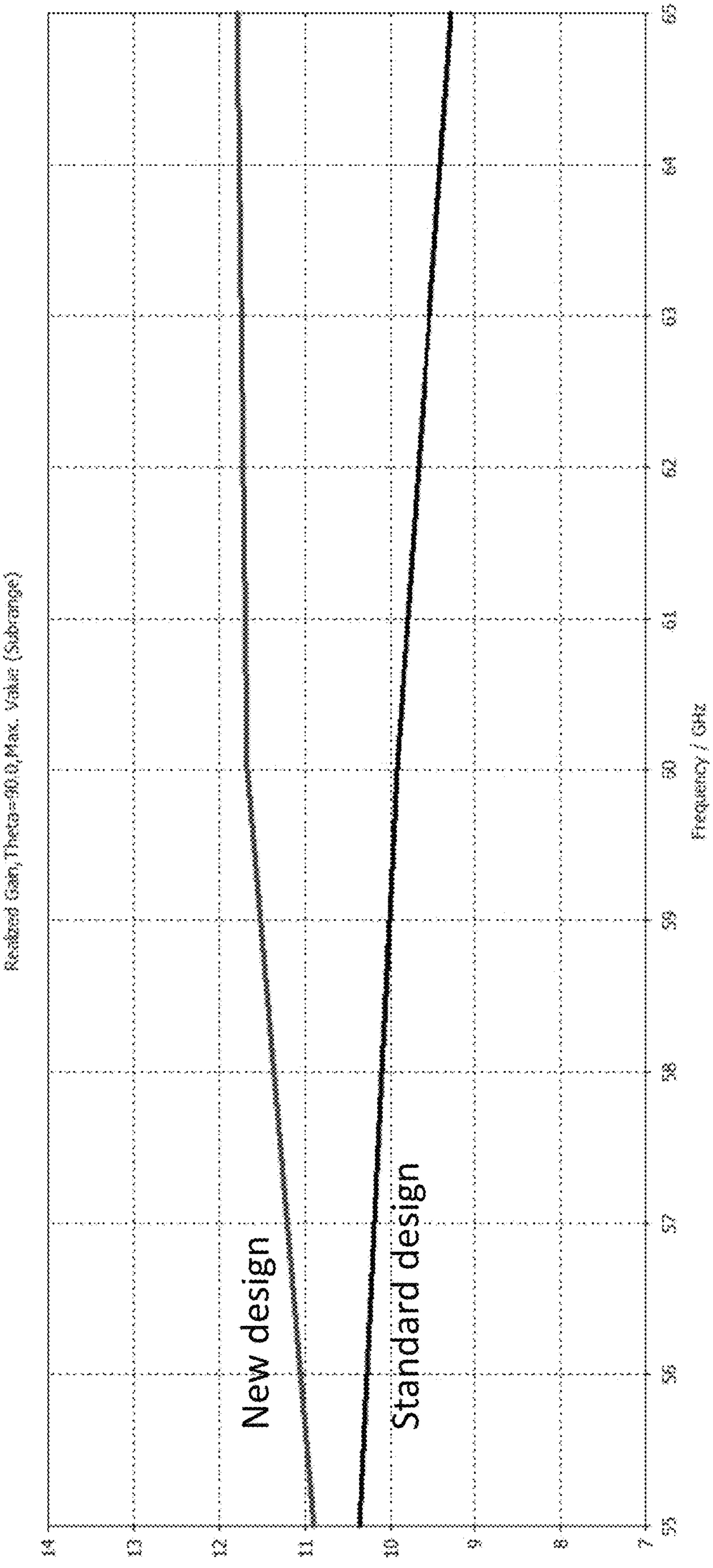
Figure 4: Realized gain for coaxial feed structure optimized for return loss and overall performance.

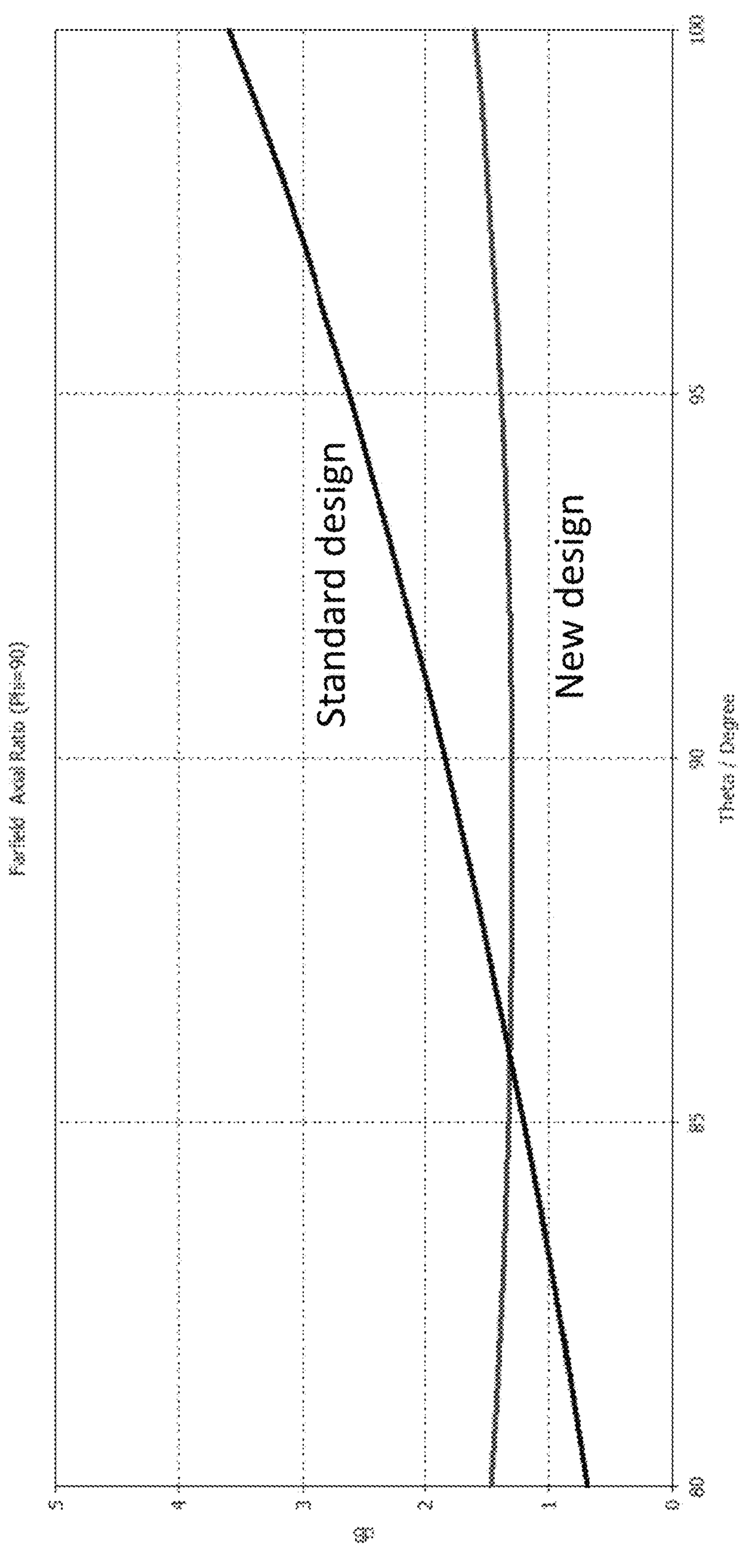
Figure 5: Axial ratio for coaxial feed structure optimized for return loss and overall performance.

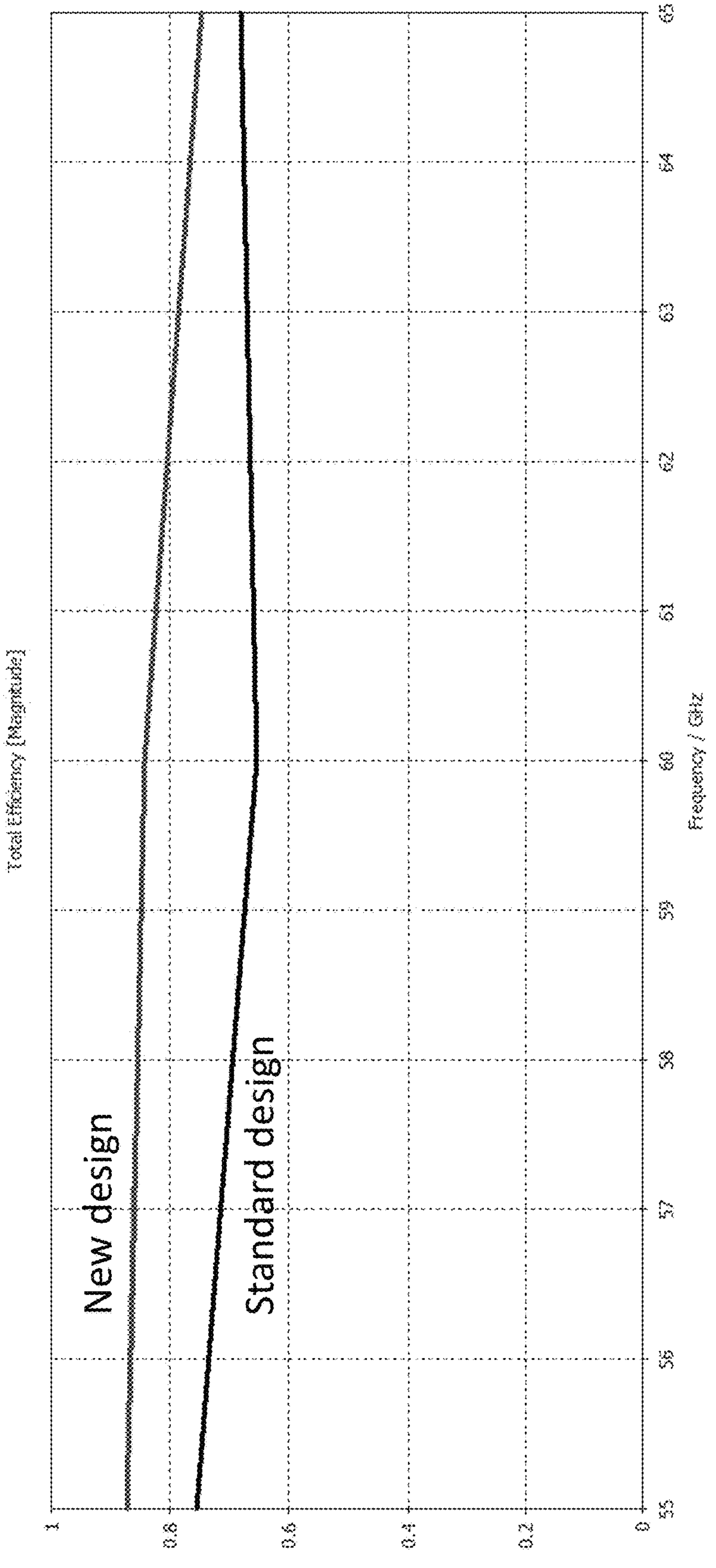
Figure 6: Total efficiency for coaxial feed structure optimized for return loss and overall performance.

HELIX ANTENNA FEED STRUCTURE WITH COAXIAL IMPEDANCE CONTROL

BACKGROUND

The present invention relates to helical antenna structures, particularly to helical antenna structures designed to operate in the millimeter wave range.

A helical antenna structure designed to operate in the millimeter wave range is disclosed, for example, in U.S. Patent Publication 20200076471, entitled High Bandwidth Scalable Wireless Near-field Interface, incorporated herein by reference. The use of arrays of miniature helical antennas for short-range, high-bandwidth radio links is described. Adaptations of helical antenna structures for other applications are described herein.

BRIEF DESCRIPTION OF THE DRAWINGS

FIG. 1B is a cross-sectional view of a helix antenna with feed structure configured to minimize return loss.

FIG. 2B is a performance plot comparing the antennas of FIG. 1B and FIG. 3B.

FIG. 3A shows a cross-sectional view of one embodiment of coaxial impedance control composed of two dielectric pucks of specific dimensions specifically located with the cylindrical waveguiding structure to achieve optimum antenna behavior.

FIG. 3B is a cross-sectional view of a helix antenna with feed structure configured to obtain desired performance parameters.

FIG. 4 is another performance plot comparing the antennas of FIG. 1B and FIG. 3B.

FIG. 5 is another performance plot comparing the antennas of FIG. 1B and FIG. 3B.

FIG. 6 is another performance plot comparing the antennas of FIG. 1B and FIG. 3B.

DESCRIPTION

Summary

A microwave helix antenna with an impedance controlled coaxial interface is disclosed.

Detailed Description

The feed structure to an antenna must convert the electromagnetic stimulus, with minimum impairment, to a form suitable for the radiating element. Conversion is generally both mechanical and electrical. The performance of the feed structure, and its interface to the radiating element, becomes critical when the overall antenna is electrically large, for example when the stimulus wavelength is on the order of the physical dimensions of the feed structure or radiating element. A dipole antenna fed by a coaxial cable often adopts the electrically small gap assumption, in which the gap distance between each dipole element is much smaller than the dipole wavelength, and hence the electric potential appears constant over the gap. In contrast, when the stimulus wavelength is on the order of the physical dimensions of the feed structure or radiating element, and the electrically small assumption cannot be made, electromagnetic wave phenomena will substantially impact overall antenna performance. In this case, and near-field, reactive, and higher-order mode effects become important. Their presence and mutual interaction impact radiation performance of the antenna, producing substantial deviation from optimum. A helix antenna element with an impedance controlled coaxial feed structure is disclosed.

A helix antenna, like many antennas, is prone to interactions with surrounding materials. This interaction may positively or negatively impact the performance of the antenna. For a helix antenna to have a low axial ratio and high gain, the electromagnetic interactions with nearby objects must not negatively interfere, but support, the travelling wave on the helix. For low frequencies, lower than a few gigahertz, a coaxial cable with a diameter much smaller than the diameter of the helix loops is readily available. In this case, the coaxial cable could be used to drive the helix antenna directly without concern of the coaxial cable interacting much with the electromagnetic fields produced by the helix. At higher frequencies, the helix coil must be shrunk to the point where the coaxial cables are no longer comparatively small. This requires a simultaneous design of the coaxial feed and helix structure.

Figure 1A:
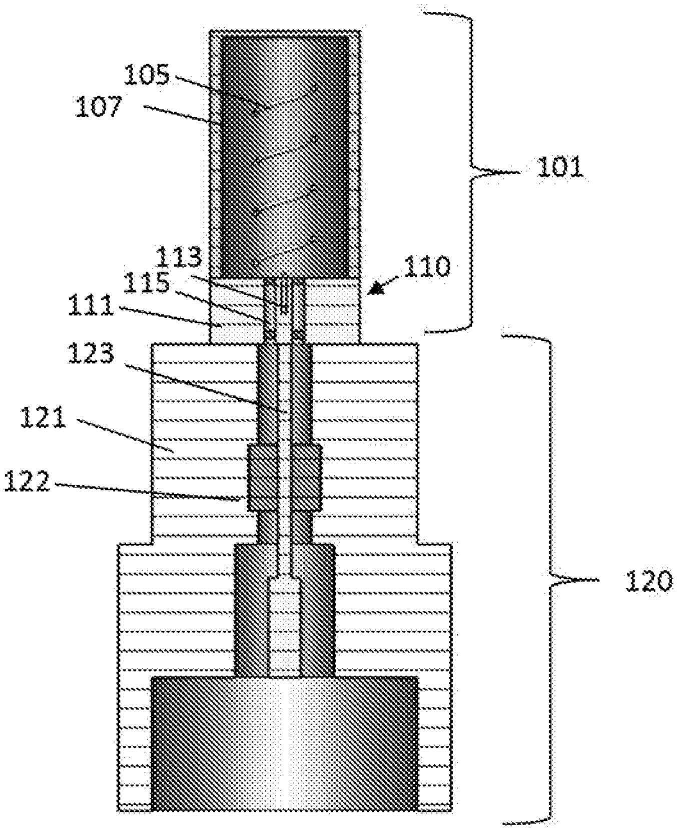
FIG. 1A shows a cross-sectional view of one embodiment of a helix antenna with coaxial impedance control, the self-contained helix antenna with coaxial impedance control.

Referring now to FIG. 1A, a cross-sectional view is shown of a self-contained helix antenna 101 mounted to a coaxial coupler 120, the coaxial coupler being provided with impedance control features. The helix antenna may include a helical winding 105, a radome 107 and a surface-mount transition element 110. In the illustrated embodiment, the winding is surrounded by air with sides of the windings being spaced apart from the radome, which may be formed of a plastic material, for example. The transition element may include a metal body 111 provided with a center conductor 113 that is insulated from the remainder of the metal body by an insulating ring 115. The center conductor is provided with an orifice to receive an end of the winding 105. In other embodiments, the center conductor 113 and the winding 105 may be of one piece, integrally formed.

The coupler 120 may include a metal body 121 provided with a center conductor 123. In the illustrated embodiment, the center conductor is separated from the metal body by a dielectric member 122. The center conductor is configured to be received within an orifice of a coaxial cable. The metal body may be provided with threads to receive a standard coaxial connector such as a 1.85 mm or 2.92 mm coaxial connector of arbitrary gender. The helix antenna assembly, including the surface mount transition, may be surface-mounted to the coupler using standard techniques.

Figure 2A:
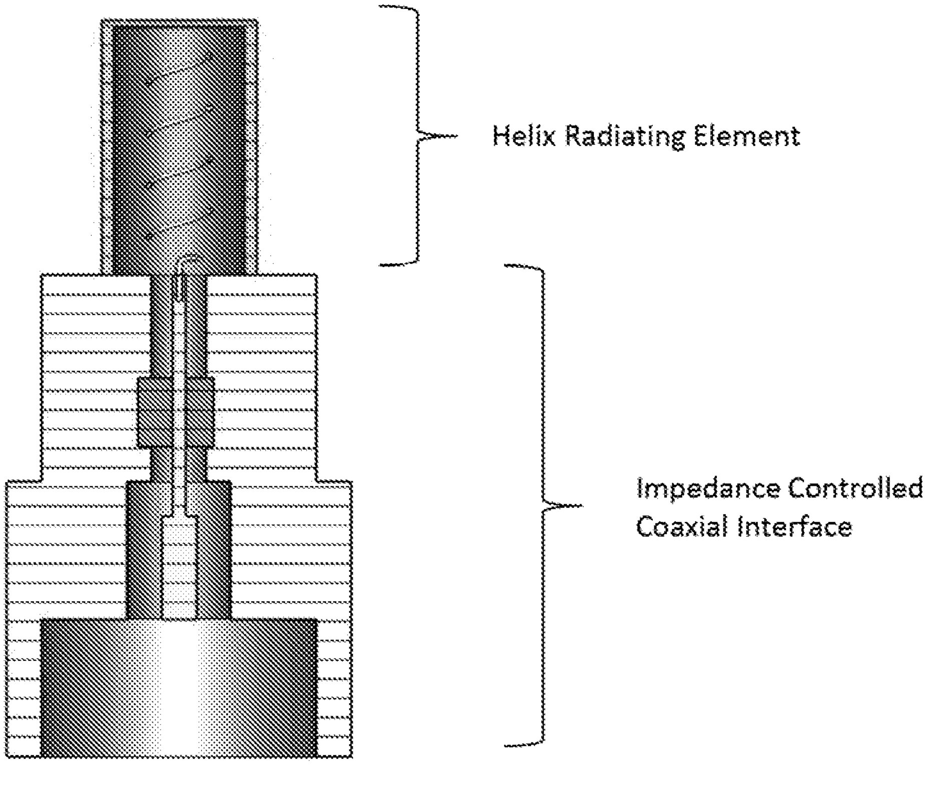
FIG. 2A shows a cross-sectional view of yet another embodiment of a helix antenna with coaxial impedance control, the a unibody helix antenna with coaxial impedance control.

Impedance control of the coaxial coupler may be achieved by stepping down dimensions of the medium surrounding the center conductor at one or more intervals (for example N4 intervals, or other fractional wavelength intervals) progressing in a direction from the coaxial cable to the helix antenna. As described below, impedance control may further be achieved employing dielectric beads, by varying bead thickness and relative displacement from one another, and bead diameter and composition Referring to FIG. 2A, an antenna assembly is shown similar to that of FIG. 1A. However, the surface mount transition has been eliminated. Instead, an end of the winding of the antenna is inserted directly into an orifice of the coupler. No surface-mounting is required. In some embodiments, the helix coil and the center conductor may be of one piece, integrally formed.

Beyond mere impedance control, it may be desirable to control other transmission properties of the antenna assembly. Referring to FIG. 3A, a diagram is shown of a coaxial coupler provided with features to achieve control of transmission properties. In particular, within a gap between a center conductor 301 and a metal body 303, dielectric members 305A and 305B (dielectric "pucks") are provided. The number and spacing of dielectric pucks may be varied to obtain the desired control of transmission properties.

Example

The feed structure to an antenna must convert the electromagnetic stimulus, with minimum signal impairment, to a form suitable for the radiating element. Conversion is both mechanical and electrical, with minimum signal conversion impairment often taken to mean the reflection loss (RL) of the feed structure, since the transmission loss is generally low. With the present coaxially fed helix antenna, overall desired antenna performance does not necessarily obtain by optimizing RL. Instead, specific configuration of its coaxial feed structure improves overall antenna radiating performance, such as gain, axial ratio (AR), and total efficiency. To demonstrate, a standard helix design with a coaxial feed structure optimized for RL is described, after which a corresponding design with the present teachings applied is described, illustrating the effect on overall helix antenna performance.

FIG. 1B shows a cross-section of a helix antenna. A coaxial element 101B is the feed structure in this design, and its function is to convert electromagnetic stimulus from a coaxial source to helix element 101A with minimum signal impairment. For the present design of FIG. 1B, feed structure 101B has been designed for optimum RL at 60 GHz, which is illustrated by FIG. 2B. Note that the RL is better than-10 dB near 60 GHz and is symmetric, a common objective for a RL-optimized feed structure.

FIG. 3B shows a cross-section of a modified helix antenna, with its various elements labeled, with helix element 301A and coaxial element 301B now designed for optimum antenna performance, specifically gain, AR, and total efficiency, at 60 GHz. The RL is illustrated by FIG. 2B. Transmission properties control features are provided, in this example, two dielectric pucks 305A and 305B, with approximate spacings of $\lambda/8$ and $\lambda/2$, respectively, as measured from the lower transverse surface of SMT 301B.

FIG. 4 compares realized gain of the standard design and new design, showing a substantial improvement. Similarly, FIGS. 5 and 6 show AR and total efficiency, respectively. The overall efficiency has increased substantially in spite of the reduction in RL, showing the impact of the transmission properties control features.

NON-LIMITING ILLUSTRATIVE EMBODIMENTS OF THE INVENTIVE CONCEPTS

The following is a numbered list of non-limiting illustrative embodiments of the inventive concepts disclosed herein:

Illustrative embodiment 1. An antenna structure comprising a helix radiating element coupled to an impedance controlled coaxial interface.

Illustrative embodiment 2. The antenna structure of illustrative embodiment 1, comprising an intermediate element comprising a surface-mount side defining a planar surface and a helix side for coupling to the helix radiating element, wherein the intermediate element and the impedance controlled coaxial interface are formed as separate pieces, further comprising a joint for joining the intermediate element and the impedance controlled coaxial interface and for electrically and mechanically pairing the helix radiating element and the impedance controlled coaxial interface.

Illustrative embodiment 3. The antenna structure of illustrative embodiment 1, wherein the helix radiating element and the impedance controlled coaxial interface are electrically and mechanically mated.

Illustrative embodiment 4. The antenna structure of illustrative embodiment 1, wherein the impedance-controlled coaxial structure is configured to simultaneously accept or mate to the helix radiating element and a coaxial center conductor of a coaxial cable, establishing a specific controlled impedance interface between the winding and the coaxial center conductor.

Illustrative embodiment 5. The antenna structure of illustrative embodiment 1, wherein the impedance controlled coaxial interface comprises a specific coaxial impedance control feature configured to achieve a desired value of at least one of directivity, gain, side-lobe suppression, efficiency, and axial ratio, due to specific coaxial impedance control.

Illustrative embodiment 6. The antenna structure of illustrative embodiment 1, wherein the specific coaxial impedance control feature comprises at least one dielectric puck of specific dimensions and specific location within the coaxial line to achieve a desired value of at least one of directivity, gain, side-lobe suppression, efficiency, and axial ratio.

Illustrative embodiment 7. The antenna structure of illustrative embodiment 1, wherein the specific coaxial impedance control feature comprises a plurality of dielectric pucks, of the same or different dimensions, specifically located within the coaxial line.

Illustrative embodiment 8. The antenna structure of illustrative embodiment 2, wherein the dielectric puck of specific dimensions and specific location within the coaxial line is located with respect to the surface mount side of the intermediate member or the helix side of the intermediate member to suppress higher-order, non-TEM, mode propagation.

Illustrative embodiment 9. The antenna structure of illustrative embodiment 1, wherein an impedance profile of the specific coaxial impedance control feature exhibits at least one of: discrete impedance variations; and continuous impedance variations.

Illustrative embodiment 10. The antenna structure of illustrative embodiment 1, wherein the impedance control coaxial interface comprises an inner conductor and an outer conductor separated by media having a dielectric constant, wherein impedance control is accomplished by controlling the dielectric constant of the media between the inner and outer conductor.

Illustrative embodiment 11. The antenna structure of illustrative embodiment 1, wherein the impedance control coaxial interface comprises an inner conductor and an outer conductor wherein in impedance control is accomplished by controlling the inner conductor diameter.

Illustrative embodiment 12. The antenna structure of illustrative embodiment 1, wherein the impedance control coaxial interface comprises an inner conductor and an outer conductor wherein impedance control is accomplished by controlling the outer conductor inner diameter.

Illustrative embodiment 13. The antenna structure of illustrative embodiment 2 wherein the impedance controlled coaxial interface is configured to receive a coaxial cable connector of 1.85 mm diameter.

Illustrative embodiment 14. The antenna structure of illustrative embodiment 2 wherein the impedance controlled coaxial interface is configured to receive a coaxial cable connector of 1.35 mm diameter.

Illustrative embodiment 15. The antenna structure of illustrative embodiment 2 wherein the impedance controlled coaxial interface is configured to receive a coaxial cable connector of 2.92 mm diameter.

Illustrative embodiment 16. The antenna structure of illustrative embodiment 3 wherein the impedance controlled coaxial interface is configured to receive a coaxial cable connector of 1.85 mm diameter.

Illustrative embodiment 17. The antenna structure of illustrative embodiment 3 wherein the impedance controlled coaxial interface is configured to receive a coaxial cable connector of 1.35 mm diameter.

Illustrative embodiment 18. The antenna structure of illustrative embodiment 3 wherein the impedance controlled coaxial interface is configured to receive a coaxial cable connector of 2.92 mm diameter.

Illustrative embodiment 19. An antenna assembly comprising: a body comprising: a threaded portion for receiving a coaxial cable; a bore; and within the bore, a female receiver for receiving a male center conductor of the coaxial cable; a helical antenna coupled to the body; and a conductive path between the female receiver and the helical antenna.

Illustrative embodiment 20. The antenna assembly of illustrative embodiment 19, wherein the body is machined or cast.

Illustrative embodiment 21 The antenna assembly of illustrative embodiment 19, wherein at least a portion of the body is axially symmetrical.

Illustrative embodiment 22. A method of coupling a coaxial cable and a surface-mount, helical antenna using a coupler comprising a mounting surface, comprising: threading an end of the coaxial cable to the coupler; and surface mounting the surface-mount, helical antenna to a mounting surface of the coupler.

Illustrative embodiment 23. A method of coupling a coaxial cable and a helical antenna using a coupler, comprising: threading an end of the coaxial cable to the coupler; and inserting an end of a coil of the helical antenna into an orifice of the coupler.

What is claimed:

1. An antenna structure, comprising:

a helix radiating element; and an impedance controlled coaxial interface having a first end and a second end opposite the first end, the first end coupled to the helix radiating element, the second end configured to receive a coaxial cable connector, the impedance controlled coaxial interface comprising an inner conductor, an outer conductor, and a medium separating the inner conductor from the outer conductor, the medium having a first section and a second section, the first section proximal to the first end and having a first cross-sectional area, the second section proximal to the second end and having a second cross-sectional area, the first cross-sectional area smaller than the second cross-sectional area;

wherein the first cross-sectional area and the second cross-sectional area are selected to achieve a desired controlled impedance so as to improve performance measured by at least one of directivity, gain, side-lobe suppression efficiency, and axial ratio.

2. The antenna structure of claim 1, wherein the helix radiating element and the impedance controlled coaxial interface are electrically and mechanically mated.

3. The antenna structure of claim 1, wherein the impedance controlled coaxial interface is configured to simultaneously accept or mate to the helix radiating element and a coaxial center conductor of the coaxial cable connector, establishing a specific controlled impedance interface between the helix radiating element and the coaxial center conductor.

4. The antenna structure of claim 1, wherein the impedance controlled coaxial interface further comprises at least one dielectric puck of specific dimensions and specific location within a coaxial line to achieve a desired value of at least one of directivity, gain, side-lobe suppression, efficiency, and axial ratio.

5. The antenna structure of claim 1, wherein the impedance controlled coaxial interface further comprises a plurality of dielectric pucks, of same or different dimensions, specifically located within a coaxial line.

6. The antenna structure of claim 1, wherein an impedance profile of the impedance controlled coaxial interface exhibits at least one of: discrete impedance variations; and continuous impedance variations.

7. The antenna structure of claim 1, wherein the medium has a dielectric constant, and wherein impedance control is further accomplished by controlling the dielectric constant of the medium between the inner conductor and the outer conductor.

8. The antenna structure of claim 1, wherein impedance control is further accomplished by controlling an outer diameter of the inner conductor.

9. The antenna structure of claim 1, wherein impedance control is further accomplished by controlling an inner diameter of the outer conductor.

10. The antenna structure of claim 1, wherein the second end of the impedance controlled coaxial interface is configured to receive the coaxial cable connector of 1.85 mm diameter.

11. The antenna structure of claim 1, wherein the second end of the impedance controlled coaxial interface is configured to receive the coaxial cable connector of 1.35 mm diameter.

12. The antenna structure of claim 1, wherein the second end of the impedance controlled coaxial interface is configured to receive the coaxial cable connector of 2.92 mm diameter.

* * * * *